C. LA DOW.
Combined Rakes and Tedders.

No. 143,166. Patented September 23, 1873.

Witnesses. Inventor.

Charles La Dow
by
William H. Low
his Attorney.

UNITED STATES PATENT OFFICE.

CHARLES LA DOW, OF SOUTH GALWAY, NEW YORK.

IMPROVEMENT IN COMBINED RAKES AND TEDDERS.

Specification forming part of Letters Patent No. 143,166, dated September 23, 1873; application filed December 27, 1872.

*To all whom it may concern:*

Be it known that I, CHARLES LA DOW, of South Galway, in the county of Saratoga and State of New York, have invented certain Improvements in Combined Hay-Rakes and Tedders, of which the following is a full and exact description, reference being had to the accompanying drawings, making a part of this specification, in which—

Figure 1:
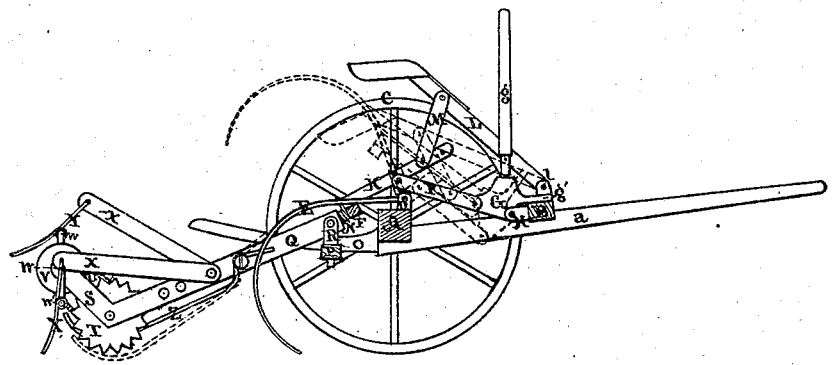
Figures 2, 3:
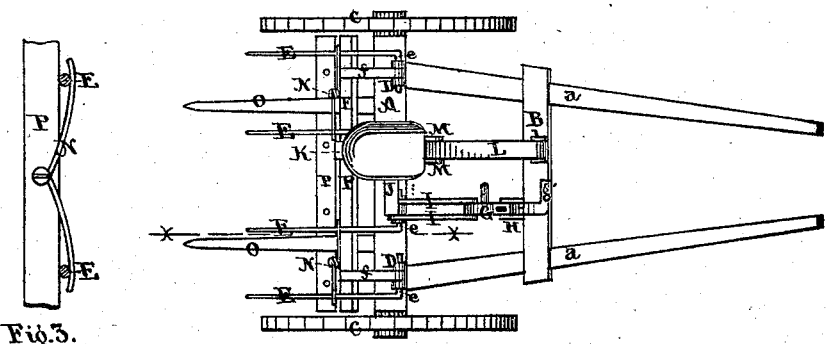

Figure 1 is a vertical section through the line $x\ x$, showing the rake and tedder attached together; Fig. 2, a plan view of the rake; and Fig. 3, an enlarged and detached view of the coil springs bearing upon the rake-teeth.

The nature of my invention consists in the combination and arrangement of the devices, as herein described and claimed.

The axle A, to which is attached the shafts $a\ a$ carrying the cross-bar B, is supported by the wheels C C. Upon its upper side a series of bearings, D D, are secured for the purpose of receiving the teeth and such other parts as are hereinafter described. The rake-teeth E E are made tapering, their lower ends being the smallest, for the purpose of more readily disengaging themselves from the collected hay. Their upper ends are bent sidewise at right angles $e\ e$ to the body of the tooth, and are inserted into openings formed for that purpose in the bearings D D, in which they have a free hinge motion. They rest upon the cross-bar F, which is attached to the bearings D D by means of the straps $f f$ secured to the cross-bar at one end, and at the other forming a hinge with the end $e$ of the teeth. The dumping device consists of the lever G, which is provided with a socket for receiving the hand-lever $g$, shown detached in Fig. 1, and is hinged to the cross-bar B by means of the bracket H. I I are rods or straps for connecting the lever G with the yoke J. The joints of of these should be so arranged as to bring the pin passing through the rods I I and lever G in a direct line with the other pins, or a little above said line, so that when the teeth are down the weight of the device will rest upon the foot-piece $g'$ of the lever G, bearing upon the cross-bar B. The arm K is secured to the yoke J and cross-bar F. To the latter it imparts its motion to effect the dumping of the rake. The seat-bar L is hinged to the cross-bar B by the bracket $l$, and is connected to the arm K by means of the rods M M. A series of holes is made in the arm K, so as to alter the point of connection of the rods M M therewith, to adjust the weight of the driver to the work. N N are coiled springs attached to the cross-bar F, and so arranged as to bear upon and keep in place two rake-teeth each, at the same time leaving each tooth an independent movement in passing over obstructions. These springs also have their ends bent downward, as shown in the drawings, so as to form a shoulder or stop for the rake-teeth to strike against when raised to their proper height. This construction of them, while it gives the teeth ample rise to pass over any ordinary obstruction, prevents them from being raised to an unnecessary height, and secures each of them from being thrown out from under its spring. O O are clearer-bars, secured to the axle A, for the purpose of removing the collected hay from the rake in dumping. P is a cross-bar, secured to the clearer-bars for the purpose of attaching the tedder thereto. The dumping is effected by forcing the lever G downward, either by means of the hand-lever $g$ or by applying the foot thereto, until the joints of the lever G and rods I I are thrown sufficiently out of line to bring the weight of the driver to bear upon the arm K, when the teeth E and the different parts of the dumping device are thrown into the position shown by the dotted lines in Fig. 1. The teeth and seat are replaced in position by moving the lever G back to its proper place. The tedder consists of the arm Q connected to the cross-bar P of the rake, by means of the swivel-pin R, by which a free movement vertically and laterally is obtained for the arm Q in passing over uneven ground or around corners. Attached to the lower end of the arm Q are the check-pieces S, between which the driving-wheel T is placed. This wheel is serrated around its periphery in such a manner as to penetrate the hay, and obtain sufficient hold upon the ground to secure its rotation. A depression is formed between its serrated flanges, for the purpose of receiving the endless chain or band U, which passes over and imparts motion to the pinion or wheel V, which is secured to the crank-shaft W. X X are vibrating arms, the lower ends of which are secured to the arm Q. Their upper ends are provided with holes for receiving the forks Y Y. These forks are each made of one piece of wire, and are coiled in such a manner as to form a bearing upon the crank-pins $w'$ $w'$ of the crank-shaft W. Z is a shield secured to the arm Q, and passing between the serrated flanges of the wheel T, for the purpose of preventing the teeth of the wheel from carrying the hay around it. It also serves when thrown down, as shown by the dotted lines in Fig. 1, as a shoe for carrying the lower end of the tedder, and by raising the teeth of the wheel T clear from contact with the ground, prevents its rotation and leaves the forks Y Y at rest. By the combined action of the cranks $w'$ $w'$ and arms X X, the forks Y Y receive motion varying in their position from a vertical to a horizontal line alternately.

A series of these tedders may be attached to each rake, if desired, holes being provided in the cross-bar P for that purpose; or, by raising the swivel-pin R, the tedder may be readily detached and the rake used independently; or, the rake-teeth may be thrown up into the position indicated by the dotted lines in Fig. 1, so as to use the tedder independently.

What I claim as my invention is—

1. The combination of the yoke J, arm K, cross-bar F, and its attached straps $f$ $f$ hinged to the axle A by the bearings D D, and the right-angled ends $e$ $e$ of the rake-teeth E E, with the seat-bar L, lever G, rods I I and M M, when arranged to operate substantially as and for the purposes set forth.

2. The arm Q, having a swivel-pin, R, when supported by the cross-bar P, and driving-wheel T, in the manner and for the purpose herein set forth.

3. The combination of the arm Q and driving-wheel T with the shield Z, substantially as and for the purpose specified.

4. The combination of arm Q, when attached to the rear part of a rake-frame, wheel T, endless chain U, wheel V, crank-shaft W, and tedder-tines Y, as and for the purpose set forth.

CHARLES LA DOW.

Witnesses:
M. McWILLIAMS,
JOHN LA DOW.